US005372618A

United States Patent [19]

Andrus, Jr.

[11] Patent Number: 5,372,618

[45] Date of Patent: Dec. 13, 1994

[54] TEMPERATURE MEASURING DEVICE FOR A GASIFIER

[75] Inventor: Herbert E. Andrus, Jr., Granby, Conn.

[73] Assignee: Combustion Engineering, Inc., Windsor, Conn.

[21] Appl. No.: 998,341

[22] Filed: Dec. 30, 1992

[51] Int. Cl.[5] ............ C10J 3/72

[52] U.S. Cl. ............ 48/87; 48/76; 48/DIG. 2; 374/121; 374/141

[58] Field of Search ............ 48/62 R, 63, 64, 66, 48/67, 69, 73, 76, 77, 87, DIG. 2, DIG. 4, 197 R, 203, 206, 210; 110/171; 374/123, 132, 135, 141, 148, 121, 161, 208, 130, 139

[56] References Cited

U.S. PATENT DOCUMENTS

| | | | |
|---|---|---|---|
| 2,963,353 | 12/1960 | Eastman | 374/123 |
| 3,197,621 | 9/1964 | Campbell | 374/141 |
| 3,845,661 | 11/1974 | Hollweck et al. | 374/148 |
| 3,847,562 | 11/1974 | Hamilton | 48/87 |
| 3,862,579 | 1/1975 | Antoine et al. | 374/208 |
| 4,134,738 | 1/1979 | Bress et al. | 48/87 |
| 4,158,552 | 6/1979 | Blaskowski et al. | 48/210 |
| 4,309,194 | 1/1982 | Salvador et al. | 48/76 |
| 4,400,097 | 8/1983 | Koschnitzke et al. | 374/121 |
| 4,411,533 | 10/1983 | Loftus et al. | 374/141 |
| 4,580,908 | 4/1986 | Stewen | 374/139 |
| 4,615,713 | 10/1986 | Meyer | 48/63 |
| 4,680,035 | 7/1987 | Tanca | 48/63 |
| 4,776,705 | 10/1988 | Najjar et al. | 374/141 |
| 5,000,580 | 3/1991 | Leininger et al. | 374/139 |
| 5,005,986 | 4/1991 | Najjar et al. | 374/139 |

FOREIGN PATENT DOCUMENTS

| | | | |
|---|---|---|---|
| 0079092 | 5/1983 | European Pat. Off. | 48/89 |

*Primary Examiner*—Peter Kratz
*Attorney, Agent, or Firm*—Arthur E. Fournier, Jr.

[57] ABSTRACT

A temperature measuring device for a gasifier of a gasifier system wherein the gasifier has a through opening formed thereon. The temperature measuring device includes a slag shield mounted on the gasifier so that a portion of the slag shield extends into the interior of the gasifier through the opening with which the gasifier is provided for this purpose, and a temperature measuring instrument mounted in supported relation within the slag shield so that a line-of-sight exists from the temperature measuring instrument into the interior of the gasifier whereat the temperature is desired to be measured. The slag shield is designed to protect the temperature measuring instrument from the slag flow within the gasifier. The temperature measuring instrument further includes cooling means for cooling at least that portion of the slag shield that extends into the interior of the gasifier, and purge gas means for supplying a flow of purge gas in surrounding relation to the temperature measuring instrument to purge particulate matter therefrom in order to ensure that the line-of-sight between the temperature measuring instrument and the interior of the gasifier remains unobscured.

3 Claims, 2 Drawing Sheets

GAS 3 56 58 64 70 12 84 86 56d 78 82 80 76 74a 74 82 80a 56a 56c 66 56b 72 68 64 60 62 3 20 14

TEMPERATURE MEASURING DEVICE FOR A GASIFIER

BACKGROUND OF THE INVENTION

This invention relates to coal gasifiers, and more specifically, to a temperature measuring device for such gasifiers.

Current governmental air pollution standards limiting the level of emissions from the stacks of fossil fuel-fired power generation equipment have created an urgent need for clean burning fuels. An obvious solution to this problem is to burn fuels which are low in particulate matter and sulfur content, and to do so in a manner that will minimize $NO_x$ emissions. However, such fuels are in relatively short supply and also are relatively more expensive.

One solution to the problem, particularly in the United States where the basic proven energy reserves are predominantly coal, is the gasification of coal to produce a fuel gas suitable for firing in a steam generator and similar devices, or for firing in a gas turbine, which is part of an integrated gasification combined cycle system (IGCC). Generally speaking, coal gasification involves the reaction of coal, at high temperatures, with a gas containing oxygen, and steam to produce a gas, containing principally carbon monoxide (CO) and hydrogen ($H_2$), which is suitable for use as a fuel gas.

The processes, which to date have been employed for purposes of achieving coal gasification, can be conveniently divided into three categories:

1. Fixed bed gasification where lump coal is supported on a grate or by other means and the flow of gas and coal may be concurrent or countercurrent;
2. Fluidized bed gasification where crushed or fine coal is fluidized by the gasifying medium, giving an expanded fuel bed that can be visualized as boiling liquid; and
3. Suspension or entrainment gasification where fine coal is suspended in the gasifying medium such that the fine coal particles move with the gasifying medium either linearly or in a vortex pattern.

At one time fixed bed gasifiers were felt by many to be the most attractive from the standpoint of economics. In this regard, the economically desirable features of fixed bed gasifiers were deemed to encompass the following features: their inherent relatively high carbon conversion ratio, the fact that a low producer volume is required per unit of gas production, and the fact that a minimum amount of fuel preparation is required in connection with the use thereof.

By way of exemplification and not limitation, one example of a fixed bed gasifier is that which forms the subject matter of U.S Pat. No. 3,920,417 entitled "Method of Gasifying Carbonaceous Material", which issued on Nov. 18, 1975 and which is assigned to the same assignee as the present patent application. In accordance with the teachings of U.S. Pat. No. 3,920,417, there is provided a method of producing a clean low BTU fuel gas by the reaction of a carbonaceous fuel with free oxygen and steam in a downdraft fixed bed gasifier. The material to be gasified is introduced at the upper end of the fixed bed gasifier where it is preheated, dried and devolatilized by a stream of hot gas from the lower zones of the fixed bed gasifier, which has been drawn upward and which is withdrawn from the fixed bed gasifier at the upper end thereof. This upward flow of gas also serves to maintain the ignition level of the carbonaceous fuel material at a predetermined level within the oxidation zone of the fixed bed gasifier. The portion of gas withdrawn from the upper end of the fixed bed gasifier, which contains the volatiles released by the carbonaceous material, is reintroduced into the fixed bed gasifier in the oxidation zone where the temperature is sufficiently high to effect thermal cracking of the volatiles to valuable hydrocarbon compounds. Continuing, as the carbonaceous fuel material moves downward through the shaft of the fixed bed gasifier it passes successively through oxidation and reduction zones where air or some other free oxygen containing gas, and steam, respectively, are introduced into the fixed bed gasifier. The resulting reactions convert the carbonaceous fuel material and other reactants to an incandescent char matrix extending to the shaft of the fixed bed gasifier, gaseous products (the makeup thereof depending upon the level of the fixed bed gasifier), and a molten slag.

A subsequent modification in the design of fixed bed gasifiers wherein a second stage has been added in cooperative association with the fixed bed gasifier forms the subject matter of U.S. Pat. No. 4,069,024 entitled "Two-Stage Gasification System", which issued on Jan. 17, 1978 and which is assigned to the same assignee as the present application. In accordance with the teachings of U.S. Pat. No. 4,069,024, there is provided a method and apparatus for directing a low BTU content synthesis gas, as produced in a fixed bed gasifier, for example, of the type previously disclosed in U.S. Pat. No. 3,920,417, through a second stage having a serially interconnected pyrolyzer of so-called "spouting bed" design wherein the hot synthesis gas from the fixed bed gasifier is contacted by a hot carbonaceous charge and lime to utilize its high sensible heat to produce a cool, higher BTU product. Reactions take place between some of the carbon of the charge and hydrogen of the gas to increase the hydrocarbon content of the gas before it is conducted to its place of use, while the lime reacts with the sulphur to reduce if not eliminate the sulphur content of the gas. The remaining charge of char is devolatilized and passed on to the fixed bed gasifier where a hot oxidizer and steam are added thereto to produce more synthesis gas that is supplied back to the second stage, i.e., to the pyrolyzer, for reaction with the carbonaceous charge and lime.

Turning next to a consideration of entrainment, i.e., suspension, gasification, there are examples thereof to be found in the prior art. By way of exemplification and not limitation in this regard, one such example of an entrainment gasification process is that which forms the subject matter of U.S. Pat. No. 4,158,552 entitled "Entrained Flow Coal Gasifier", which issued on Jun. 19, 1979 and which is assigned to the same assignee as the present patent application. In accordance with the teachings of U.S. Pat. No. 4,158,552, a high temperature level of product gas stream is formed by burning primarily char with the existing air supply. Immediately thereafter additional char is introduced into the high temperature stream for gasification of these carbon particles. Then, following the endothermic gasification reaction which cools the gases, new fresh coal is introduced with this coal being devolatilized at relatively low temperature, thus utilizing low temperature heat. Entrained char particles are thereafter removed from the gas stream and reintroduced into the gasifier. The low temperature devolatilization of the fresh coal is achieved by gas temperatures at a level which is insufficient to effectively continue the carbon gasification process. Accordingly, more of the available heat is used for the basic purpose of the coal gasification operation, which is of course to produce gas having the maximum reasonable heating value.

Another example of an entrainment gasification process is that which forms the subject matter of U.S. Pat. No. 4,343,627 entitled "Method of Operating a Two-Stage Coal Gasifier", which issued on Aug. 10, 1982 and which is assigned to the same assignee as the present patent application. In accordance with the teachings of U.S. Pat. No. 4,343,627, an object of the invention disclosed therein is to increase the effectiveness of an entrained flow gasifier by enhancing its ability to produce a product gas having an increased heating value. Moreover, the manner in which this is accomplished is that steam is used as the conveying medium for carrying the additional coal to be injected into the reduction zone from the coal source to the reduction zone. Upon entering the reduction zone, the steam reacts with the additional coal to form carbon monoxide and hydrogen. Therefore, rather than lowering the heating value of the product gas as is the case when either air or inert gas are used as the conveying medium, the steam reacts to form additional carbon monoxide and hydrogen thereby increasing the heating value of the product gas formed in the reduction zone. Further, by using steam as the conveying medium, the possibility of an explosion in the transport line between the coal source and the reduction zone is eliminated.

Yet another example of an entrained gasification process is that which forms the subject matter of U.S. Pat. No. 4,610,697 entitled "Coal Gasification System with Product Gas Recycle to Pressure Containment Chamber", which issued on Sep. 9, 1986 and which is assigned to the same assignee as the present patent application. In accordance with the teachings of U.S. Pat. No. 4,610,697, there is provided a pressurized coal gasifier for producing a clean, particulate free fuel gas suitable for use in a gas turbine-generator or a feedstock for a methanation or other chemical process. The subject gasification system includes a pressure containment chamber surrounding an inner, water-cooled chamber wherein a gasification reaction takes place, a second pressure containment chamber surrounding a process gas heat exchanger for cooling the gas produced by the gasification reaction, and a conduit between the first and second vessels having an outer pressure containing wall and an inner water-cooled transfer duct for conducting the produced gas from the gasifier vessel to the heat exchanger. Continuing, the gasifier vessel includes a slag tap disposed at the bottom for removal of any molten slag produced by the gasification reaction. Differential thermal expansion between the pressure containment chamber and the water-cooled gasifier chamber is accommodated without loss of inter-chamber sealing by a water seal between the chambers without the occurrence of gas leakage into the annular volume.

Still another example of an entrained gasification process is that which forms the subject matter of U.S. Pat. No. 4,680,035 entitled "Two Stage Slagging Gasifier", which issued on Jul. 14, 1987 and which is assigned to the same assignee as the present patent application. In accordance with the teachings of U.S. Pat. No. 4,680,035, a two stage coal gasifier is provided that has a vertically elongated gasifier chamber for upward flow of the gas to an opening at the top. Tubes comprising the walls of the chamber form a centrally located slag tap opening at the bottom of the chamber. In the lower portion of the gasifier is a combustion section where fuel injection nozzles inject coal tangentially along with combustion supporting air to supply the heat source. At an upper elevation is a reductor section wherein additional fuel is introduced for the purpose of gasifying this additional fuel. Between the combustor section and the reductor section there is a centrally located baffle. This baffle is larger in plan area than the tap opening and is arranged so that any slag falling around the baffle will land some distance remote from the slag tap opening. The centrally located baffle minimizes the radiation loss from the combustor to the reductor, blocks the central portion of the gasifier chamber so that gas is not drawn back down from the reductor section, and forces the slag falling from the reductor to enter the combustor at a location outboard of the slag tap opening so that it has time to be heated substantially before passing to the slag tap opening.

Although gasifier systems constructed in accordance with the teachings of the various U.S. patents to which reference has been had hereinbefore have been demonstrated to be operative for the purpose for which they have been designed, there has nevertheless been evidenced in the prior art a need for such gasifier systems to be further improved if increased use thereof is to be realized. To this end, there has been evidenced in the prior art a need for a new and improved temperature measuring device for a gasifier. Namely, for a gasifier to operate properly, it is imperative that the temperatures therewithin be at the desired levels. For example, in the lower portion of the gasifier it is normally desired that the temperatures be at approximately 3000° F. in order to ensure that the requisite gasification reactions will occur as well as to ensure that slagging will occur. On the other hand, in the upper portion of the gasifier it is important that the temperature therewithin remain above 1700° F. or else the gasification reactions that it is desired to have take place therewithin will cease to occur.

There thus exists a need to obtain measurements of temperature within the gasifier in order to ensure that the proper temperatures are being maintained therewithin. Heretodate, however, it has been difficult to obtain such temperature measurements within the gasifier. There are several reasons for this. For instance, it is difficult to effect temperature measurements within the gasifier by means of a temperature probe, which for purpose of its operation needs to be inserted into the gasifier. This is primarily due to the fact that slag is present along the walls of the gasifier and the temperature probe must of necessity be made to pass therethrough if measurements of temperature within the interior of the gasifier are to be obtained therewith. Secondly, it has been difficult heretodate to obtain reliable measurements of temperature within the gasifier. This is attributable in large part to the fact that the hostile environment in the form of dust, etc., which exists within the gasifier, effectively tends to obscure the temperature measuring device such that measurements may not be obtainable at all therewith, or if obtainable the measurements may be distorted, i.e., may not accurately indicate the actual value of the temperature that is being measured.

It is, therefore, an object of the present invention to provide a new and improved device for obtaining measurements within a gasifier.

It is another object of the present invention to provide such a new and improved measuring device which is operative to measure temperature within a gasifier.

Another object of the present invention is to provide such a new and improved temperature measuring device which is unaffected by the slagging that takes place within the gasifier.

A still another object of the present invention is to provide such a new and improved temperature measuring device which is characterized in the fact that the temperature measuring device is provided with shielding means operative for shielding the temperature measuring device from slag flow.

A further object of the present invention is to provide such a new and improved temperature measuring device which is unaffected by the hostile environment within the gasifier in which the temperature measuring device is being utilized.

A still further object of the present invention is to provide such a new and improved temperature measuring device which is characterized in the fact that the temperature measuring device is provided with purging means operative for purging particulate matter therefrom so as to thereby ensure that the temperature measuring device remains unobscured.

Yet an object of the present invention is to provide such a new and improved temperature measuring device that is advantageously characterized in that it is suitable for employment in newly constructed gasifiers as well as being equally suitable for employment in retrofit applications.

Yet a further object of the present invention is to provide such a new and improved temperature measuring device that is advantageously characterized in that it is relatively inexpensive to provide, yet despite being relatively simple in construction is capable of reliable operation.

SUMMARY OF THE PRESENT INVENTION

In accordance with the present invention there is provided a temperature measuring device for gasifiers that is operative for obtaining measurements of temperature within the gasifier. The subject temperature measuring device is designed to be supported in mounted relation on the wall of the gasifier. The subject temperature measuring device includes a slag shield, slag shield mounting means, slag shield cooling means, a temperature measuring instrument, mounting means for the temperature measuring instrument and purge gas means. The slag shield mounting means is operative to mount the slag shield on the wall of the gasifier such that a portion of the slag shield extends into the interior of the gasifier. The slag shield cooling means is operative to effect cooling of the slag shield. The temperature measuring instrument is operative for obtaining the measurements of temperature within the gasifier. The mounting means for the temperature measuring instrument is operative for supporting the temperature measuring instrument in mounted relation relative to the slag shield. The purge gas means is operative for supplying a flow of purge gas in surrounding relation to the temperature measuring instrument.

DESCRIPTION OF THE PREFERRED EMBODIMENT

Figure 1:
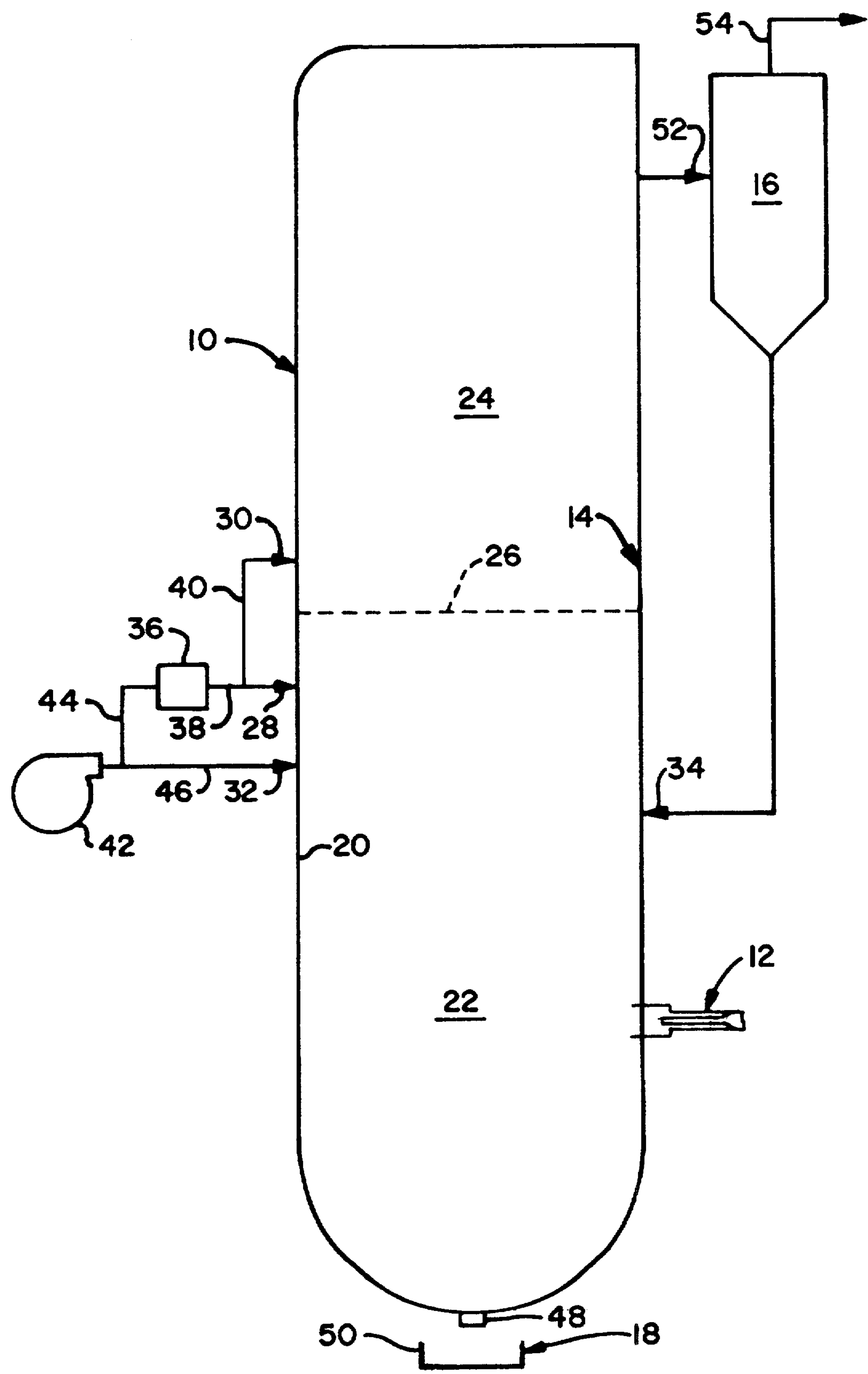
FIG. 1 is a diagrammatic representation of a gasifier embodying a temperature measuring device constructed in accordance with the present invention.

Referring now to the drawing, and more particularly to FIG. 1 thereof, there is depicted therein a gasifier system, generally designated by the reference numeral 10, that embodies a temperature measuring device, generally designated by the reference numeral 12, constructed in accordance with the present invention. In addition to the temperature measuring device 12, the gasifier system 10 as best understood with reference to FIG. 1 of the drawing includes a gasifier vessel, generally designated by the reference numeral 14; a separator system, generally designated by the reference numeral 16; and a slag discharge means, generally designated by the reference numeral 18.

In accordance with the illustrated embodiment in FIG. 1 of the gasifier system 10, the gasifier vessel 14 embodies a construction wherein the walls thereof, denoted by the reference numeral 20 in FIG. 1, consist of a multiplicity of tubes, through which water is designed to flow, that are interconnected one to another such as by fusion welding whereby the gasifier vessel 14 constitutes a gas-tight, fusion welded, water-cooled tube wall enclosure, which is similar in construction to that of electric utility boilers. In a fashion similar to that of electric utility boilers, steam is generated within the walls 20 of the gasifier vessel 14 through the conversion to steam of the water flowing through the tubes that comprise the walls 20 of the gasifier vessel 14. This steam is then available for use within the gasifier vessel 14 itself and/or for use externally of the gasifier vessel 14 such as, for example, to generate power in a power generation application. However, since the primary function that is to be served by the heat, which is generated within the gasifier vessel 14, is to effectuate therewithin the gasification of coal, the gasifier vessel 14 is designed so that a slag layer will be retained on the inner surface of the walls 20 of the gasifier vessel 14. This slag layer is intended to be operative to limit the heat adsorption in the water walls 20 of the gasifier vessel 14 to a small percentage of the total heat that is generated within the gasifier vessel 14.

With further reference to FIG. 1, the gasifier vessel 14 as illustrated therein is divided into two interconnected zones, i.e., stages, which are designated from bottom to top in FIG. 1 by the reference numerals 22 and 24. These stages 22 and 24 will for ease of reference be henceforth referred to herein as the first stage 22 and the second stage 24. Finally, it should be clearly understood that the gasifier vessel 14 in terms of its actual physical configuration is continuous in length, and that although from the standpoint of what occurs within the gasifier vessel 14, the gasifier vessel 14 may be considered to embody two stages, i.e., the first stage 22 and the second stage 24, the demarcation between these stages has been depicted, simply for ease of reference, through the use of the imaginary, dotted line that is denoted by the reference numeral 26 in FIG. 1 such that the dotted line 26 as employed in FIG. 1 is simply intended to illustrate the approximate location within the gasifier vessel 14 whereat the first stage 22 ends and the second stage 24 begins.

In accordance with the coal gasification process that is practiced with a multistage gasifier system, such as the gasifier system 10, that is depicted in FIG. 1 of the drawing, coal, as shown at 28 and 30, respectively, in FIG. 1, is injected into two areas of the gasifier vessel 14. One of these areas, for example, that denoted in FIG. 1 as the first stage 22 of the gasifier vessel 14, is intended to be a hot region at the bottom of the gasifier vessel 14 where the gas temperature is higher than the ash melting temperature. Some of the coal particles, shown at 28 in FIG. 1, and most of the air, shown at 32 in FIG. 1, is injected into the bottom region, i.e., into the first stage 22, of the gasifier vessel 14 to supply the heat that is required in order to raise the gas temperature therewithin. Recycled char, which contains some carbon and ash, may also be injected, as shown at 34 in FIG. 1, into this bottom region, i.e., first stage 22, where the char carbon is gasified, and the ash from the coal particles 28 and 30 and the recycled char 34 is melted and is slagged out of the gasifier vessel 14 through the operation of the slag discharge means 18 in a manner to which further reference will be had hereinafter.

In the other area, i.e., in the second stage 24, of the gasifier vessel 14 the rest of the coal particles, i.e., the coal particles shown at 30 in FIG. 1, and as little air as possible is injected therewithin into the hot gases which have been generated in the bottom region, i.e., the first stage 22, of the reaction vessel 14. These hot gases as they flow through the second stage 24 of the gasifier vessel 14 devolatilize the coal particles 30 that have been injected into the second stage 24 of the gasifier vessel 14 and then react with, i.e., effect the gasification of, these devolatilized coal particles 30 to form CO, $CO_2$, $H_2$ and $H_2O$. The gasification reactions to which reference is had here require both heat and residence time.

A description will next be had herein of the manner in which the coal particles 28 and 30 are supplied to the gasifier vessel 14 of the gasifier system 10 as well as of the manner in which the air 32 is supplied to the gasifier vessel 14 of the gasifier system 10. For purposes of this description, reference will be had in particular to FIG. 1 of the drawing. As depicted therein, there is provided a pulverizer, denoted by the reference numeral 36. In a manner well-known to those skilled in the art of pulverization, the pulverizer 36 is designed to be operative to effectuate the reduction of the coal that is supplied thereto for pulverization to coal particles of the size that it is desired to inject into the gasifier vessel 14 of the gasifier system 10. Continuing, the pulverizer 36 is interconnected with the first stage 22 of the gasifier vessel 14 by means of the fuel duct, denoted by the reference numeral 38 in FIG. 1, and is interconnected with the second stage 24 of the gasifier vessel 14 by means of the fuel duct, denoted by the reference numeral 40 in FIG. 1. Any conventional form of injection means, not shown in the interest of maintaining clarity of illustration in the drawing, suitable for use for such a purpose may be utilized for purposes of effecting the injection of the coal particles 28 from the fuel duct 38 into the first stage 22 of the gasifier vessel 14, and for purposes of effecting the injection of the coal particles 30 from the fuel duct 40 into the second stage 24 of the gasifier vessel 14.

With further reference to FIG. 1 of the drawing, there is also provided as depicted therein a fan, denoted by the reference numeral 42. Air is supplied from the fan 42 to the pulverizer 38 by means of an air duct, as shown at 44 in FIG. 1. To this end, the air that is supplied from the fan 42 to the pulverizer 38 through the air duct 44 is employed for purposes of effecting the transport in an air stream in a manner which is well-known to those skilled in the art of pulverization of the coal particles 28 through the fuel duct 38 to the first stage 22 of the gasifier vessel 14 and of the coal particles 30 through the fuel duct 40 to the second stage 24 of the gasifier vessel 14. In addition, as can be seen with reference to FIG. 1 of the drawing, the air 32, which is injected into the first stage 22 of the gasifier vessel 14 is supplied thereto from the fan 42 through an air duct, which is denoted in FIG. 1 by the reference numeral 46. This air 32 that is supplied to the first stage 22 of the gasifier vessel 14 through the air duct 46 is the air that is required to support combustion of the coal particles 28 that are injected into the first stage 22 of the gasifier vessel 14 after being transported thereto through the fuel duct 38. Any conventional form of injection means, not shown in the interest of maintaining clarity of illustration in the drawing, suitable for use for such a purpose may be utilized for purposes of effecting the injection of the air 32 from the air duct 46 into the first stage 22 of the reaction vessel 14.

Referring again to the gasifier vessel 14 of the gasifier system 10, as has been described hereinbefore coal particles 28 are injected into the first stage 22 of the gasifier vessel 14 after being transported through the fuel duct 38 to the first stage 22 in an air stream. Approximately two-thirds of the coal particles, which are injected into the gasifier vessel 14, enter through the first stage 22 as coal particles. In turn, again as has been described hereinbefore the air 32, which is required to effectuate the combustion of the coal particles 28 within the first stage 22 of the gasifier vessel 14, is injected into the first stage 22 after being supplied thereto from the fan 42 through the air duct 46. The combustion of the coal particles 28 within the first stage 22 of the gasifier vessel 14 is designed to produce a temperature therewithin, which is normally on the order of approximately 3000° F. Such a temperature has been found to be sufficient for purposes of enabling the gasification reactions to take place that are desired. In addition, such a temperature is sufficient for purposes of enabling slagging to occur.

The slag, which comprises the mineral matter in the coal particles 28 and 30 that are injected into the reaction vessel 14, must be maintained in a molten state so that the slag will flow freely within the gasifier vessel 14. As has been mentioned briefly hereinbefore, the gasifier system 10 as depicted in FIG. 1 of the drawing includes a slag discharge means 18. The slag discharge means 18, as best understood with reference to FIG. 1, includes a suitably dimensioned slag tap, denoted in FIG. 1 by the reference numeral 48, and a slag tank, denoted by the reference numeral 50 in FIG. 1. The slag tap 48 is suitably formed at the bottom, as viewed with reference to FIG. 1, of the first stage 22 of the gasifier vessel 14. It is through the slag tap 48 that the molten slag leaves the gasifier vessel 14. Upon passing through the slag tap 48, the molten slag drops into the slag tank 50, which as shown in FIG. 1 is suitably positioned for this purpose below the slag tap 48. In the slag tank 50, which is preferably water filled, the molten slag is quenched, and as a consequence of such quenching is transformed into an inert, glassy, granular material.

The hot gases, which are generated within the first stage 22 of the gasifier vessel 14 from the combustion therewithin of the coal particles 28 and air 32, rise within the gasifier vessel 14, and in doing so leave the first stage 22 and enter the second stage 24 of the gasifier vessel 14. As has been described hereinbefore, the coal particles 30, i.e., the remaining one-third of the coal particles which are fed to the gasifier vessel 14, are injected into the second stage 24 thereof. The coal particles 30, in a fashion similar to that described hereinbefore in the case of the coal particles 28, are transported through the fuel duct 40 to the second stage 24 of the gasifier vessel 14 in an air stream. Gasification of the coal particles 30 takes place within the second stage 24 of the gasifier vessel 14. The temperatures that exist within the second stage 24 of the gasifier vessel 14 and at which this gasification takes place are above 1700° F. The gasification reactions that occur within the gasifier vessel 14 are endothermic and continue until the temperature within the gasifier vessel 14 drops to a point where the reaction rate becomes too low, i.e., wherein the temperature becomes too low within the gasifier vessel 14 to effectively support the desired gasification reactions therewithin. It should be noted, however, that the higher the temperatures are that are generated within the gasifier vessel 14 the faster will the desired gasification reactions take place therewithin. When the temperature thereof drops to below 1700° F., it is at this point that the gases in the form of a product gas stream along with char, which consists of a mixture of unburned carbon and ash and which has become entrained in the product gas stream, leaves the gasifier vessel 14 as has been depicted schematically through the use of the reference numeral 52 in FIG. 1 of the drawing.

From the gasifier vessel 14, the product gas stream with the char still entrained therewithin flows, as depicted schematically at 52 in FIG. 1, to the separator means 16. The separator means 16 may take the form of a cyclone, or any other similar conventional device, that is operative to effectuate therewithin the separation of the char, which is entrained within the product gas stream, from the product gas stream itself. Following the separation of the char therefrom the product gas stream, as depicted at 54 in FIG. 1 of the drawing, exits from the separator means 16. Likewise the char 34, following the separation thereof from the product gas stream in the separator means 16, also exits from the separator means 16 and as has been briefly mentioned hereinbefore is recycled back to the gasifier vessel 14 and, more specifically, to the first stage 22 of the gasifier vessel 14. To this end, the carbon portion of this char 34, which is recycled to the first stage 22 of the gasifier vessel 14, is gasified therein, while the ash portion thereof is melted and is slagged out of the gasifier vessel 14 in accordance with the operation of the slag discharge means 18, which has been described hereinbefore.

There will next be set forth herein a description of the temperature measuring device 12 with which in accordance with the present invention the gasifier system 10 that is depicted in FIG. 1 of the drawing is suitably provided. For this purpose, reference will be had in particular to FIGS. 2 and 3 of the drawing. As mentioned herein previously, the temperature measuring device 12 is intended to be operative for obtaining measurements of temperature within the gasifier. To this end, the temperature measuring device 12 is designed to be suitably supported, in a manner which will be described more fully hereinafter, on the sidewall 20 of the gasifier vessel 14 at whatever location thereof at which it may be desired to obtain the subject temperature measurements within the gasifier vessel 14. Thus, it is to be understood that although the temperature measuring device 12 has been illustrated in FIG. 1 of the drawing as being supported at one location on the sidewall 20 of the gasifier vessel 14, this illustration of the temperature measuring device 12 at this one location on the sidewall 20 of the gasifier vessel 14 is intended to be by way of exemplification and not limitation. Namely, it is to be understood that the temperature measuring device 12 could equally well be supported at other locations on the sidewall 20 of the gasifier vessel 14 without departing from the essence of the present invention. To thus summarize, the selection of the location at which the temperature measuring device 12 is supported on the sidewall 20 of the gasifier vessel 14 is established based upon a determination of where within the gasifier vessel 14 it is desired to obtain temperature measurements by means of the temperature measuring device 12.

Figure 2:
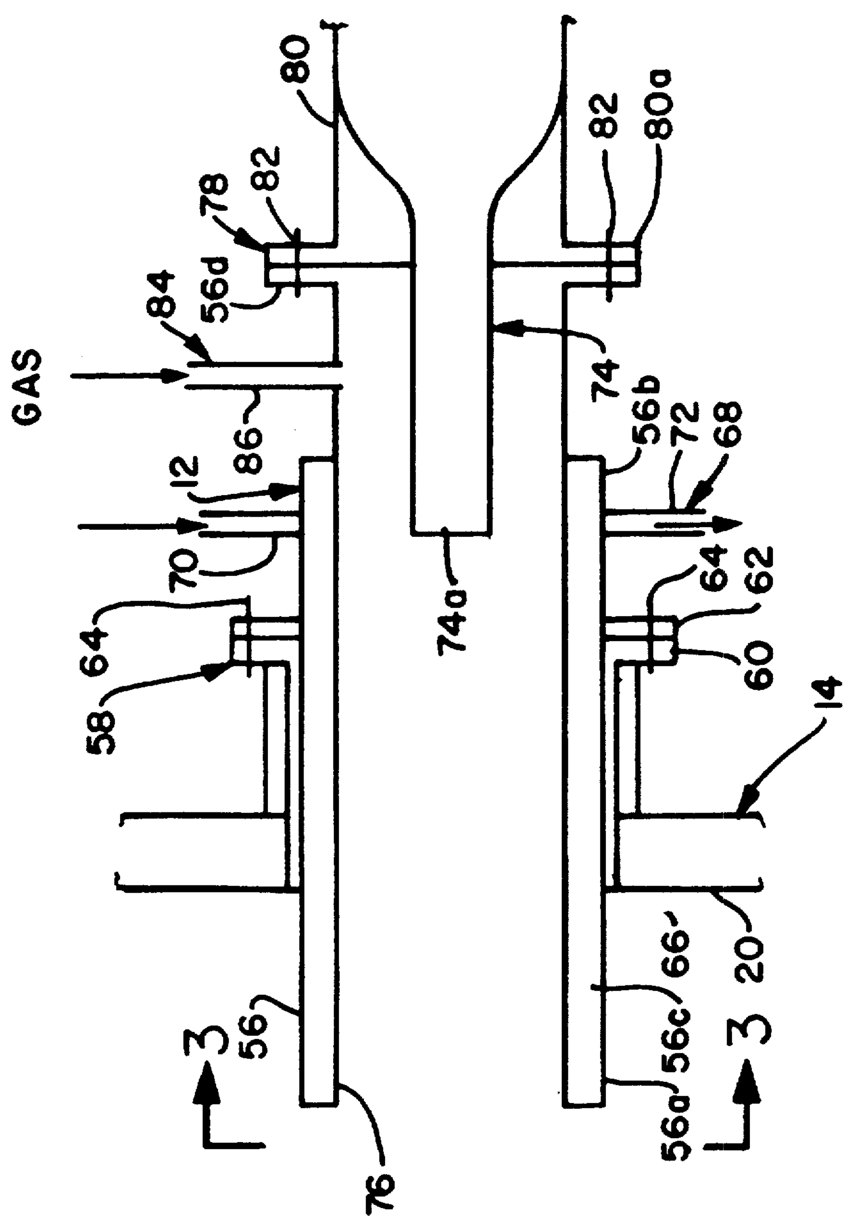
FIG. 2 is a side elevational view on an enlarged scale of the temperature measuring device portion of the gasifier illustrated in FIG. 1 constructed in accordance with the present invention.
Figure 3:
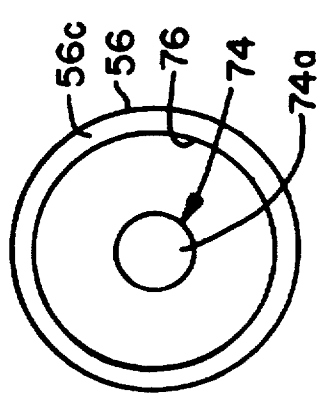
FIG. 3 is a cross-sectional view of the temperature measuring device portion of the gasifier of FIG. 2 taken substantially along the line 3—3 in FIG. 2.

Continuing with the description thereof, the temperature measuring device 12, as depicted in FIGS. 2 and 3 of the drawing, includes a slag shield denoted therein by the reference numeral 56. Moreover, as best understood with reference to FIG. 2 of the drawing, the slag shield 56 is designed to be supported on the sidewall 20 of the gasifier vessel 14 such that the slag shield 56 extends through the sidewall 20 of the gasifier vessel 14, i.e., such that the slag shield 56 has a portion, denoted by the reference numeral 56*a* in FIG. 2, located within the interior of the gasifier vessel 14 and a portion, denoted by the reference numeral 56*b* in FIG. 2, located externally of the gasifier vessel 14. In accord with the best mode embodiment of the invention and as illustrated in FIGS. 2 and 3 of the drawing, the slag shield 56 preferably is circular in shape. However, it is to be understood that the slag shield 56 could equally well embody some other configuration, e.g., could have a rectangular shape, without departing from the essence of the present invention. Finally, for a purpose yet to be described at least a portion of the slag shield 56, as best understood with reference to FIGS. 2 and 3 of the drawing, is of hollow construction, i.e., that portion which for ease of reference is identified therein by the reference numeral 56*c*.

The temperature measuring device 12 in addition includes a slag shield mounting means denoted generally by the reference numeral 58 in FIG. 2. As best understood with reference to FIG. 2, the slag shield mounting means 58 includes a first mounting flange and a second mounting flange, which are denoted by the reference numerals 60 and 62, respectively, in FIG. 2, and fastening means shown at 64 in FIG. 2. The first mounting flange 60 is designed to be secured in surrounding relation to the opening, seen at 66 in FIG. 2, in the sidewall 20 of the gasifier vessel 14 through which the slag shield 56 is designed to be inserted. More specifically, the first mounting flange 60 is secured to the outer surface of the sidewall 20 of the gasifier vessel 14 in surrounding relation to the opening 66 through the use of any conventional form of securing means suitable for use for such a purpose such as by being welded thereto. The second mounting flange 62 on the other hand is designed to be secured in surrounding relation to the slag shield 56. To this end, the second mounting flange 62 is secured to the outer surface of the slag shield 56 intermediate the ends thereof through the use of any conventional form of securing means suitable for use for such a purpose such as by being welded thereto. Thus, with the first mounting flange 60 secured in the manner described hereinbefore on the outer surface of the sidewall 20 of the gasifier vessel 14 and with the second mounting flange 62 secured in the manner described hereinbefore on the outer surface of the slag shield 56, the slag shield 56 is designed to be inserted through the opening 66 formed in the sidewall 20 of the gasifier vessel 14 until the second mounting flange 62 is located in abutting engagement with the first mounting flange 60. Thereafter, for purposes of securing the so positioned slag shield 56 in place within the opening 66, the first mounting flange 60 and the second mounting flange 62 are designed to be securely fastened together. In this regard, any conventional form of fastening means suitable for use for such a purpose may be employed for purposes of effectuating the fastening together of the first mounting flange 60 and the second mounting flange 62 such as, for example, the plurality of threaded fasteners that have been depicted at 64 in FIG. 2.

Because the temperatures within the gasifier vessel 14 are relatively high, e.g., ranging from approximately 3000° F. in the lower portion, i.e., first stage 22, of the gasifier vessel 14 to above 1700° F. in the upper portion, i.e., second stage 24, of the gasifier vessel 14, at least that portion **56*a* of the slag shield 56, which projects into the interior of the gasifier vessel 14, in accord with the best mode embodiment of the invention is preferably cooled so as to thereby render the slag shield 56 less susceptible to being damaged by the relatively high temperatures to which the slag shield 56 is being exposed. To this end, the temperature measuring device 12 constructed in accordance with the present invention includes slag shield cooling means, denoted generally by the reference numeral 68 in FIG. 2. The slag shield cooling means 68, as best understood with reference to FIG. 2, includes inlet pipe means, denoted by the reference numeral 70 in FIG. 2, and outlet pipe means, denoted by the reference numeral 72 in FIG. 2. Both the inlet pipe means 70 and the outlet pipe means 72, as illustrated in FIG. 2 of the drawing, are suitably mounted in spaced relation to each other on the outer surface of the slag shield 56 such that both the inlet pipe means 70 and the outlet pipe means 72 are operatively connected in fluid flow relation to that portion 56*c* of the slag shield 56 which is of hollow construction. As such, the inlet pipe means 70 is designed to function as an inlet to the hollow interior of the portion 56*c* of the slag shield 56 whereas the outlet pipe means 72 is designed to serve as an outlet from the hollow interior of the portion 56*c* of the slag shield 56. Thus, in accord with the best mode embodiment of the invention the slag shield 56 of the temperature measuring device 12 is designed to be cooled by injecting a suitable cooling medium, such as water, by means of the inlet pipe means 70 into the hollow interior of the portion 56 of the slag shield 56 whereupon after flowing through the hollow interior of the portion 56*c* of the slag shield 56 the cooling medium is made to exit therefrom through the outlet pipe means 72. The cooling medium, which is utilized for this purpose, may be provided from any suitable source thereof, not shown in the drawing in the interest of maintaining clarity of illustration therein, to which the inlet pipe means 70 is suitably connected for this purpose, and may be made to return to this suitable source (not shown) thereof by means of the outlet pipe means 72, which is suitably connected thereto for this purpose, after the cooling medium has effectuated the cooling of the slag shield 56 in the course of having been made to flow through the hollow interior of the portion 56*c* of the slag shield 56**.

Continuing with the description thereof, the temperature measuring device 12 for purposes of actually obtaining measurements of temperature therewith includes a temperature measuring instrument, denoted generally by the reference numeral 74 in FIGS. 2 and 3 of the drawing. The temperature measuring instrument 74 is intended to be employed as a line-of-sight instrument. To this end, by way of example the temperature measuring instrument 74 may take the form of a radiation thermometer of conventional construction or an optical pyrometer of conventional construction. Moreover, the temperature measuring instrument 74 is designed to be housed in a manner to be more fully described hereinafter within the through passage, seen at 76 in FIGS. 2 and 3 of the drawing, with which the slag shield 56 is suitably provided for this purpose. As such, a line-of-sight exists from the end **74*a* of the temperature measuring instrument 74 through the open end of the slag shield 56 to the interior of the gasifier vessel 14 whereby measurements, i.e., readings, can be made by the temperature measuring instrument 74 of the temperatures that exist within the interior of the gasifier vessel 14 within the line-of-sight of the temperature measuring instrument 74 when the temperature measuring instrument 74 is so housed within the through passage 76 of the slag shield 56**.

For purposes of effecting the mounting of the temperature measuring instrument 74 within the through passage 76 of the slag shield 56, the temperature measuring device 12, as best understood with reference to FIG. 2 of the drawing, is provided with mounting means, denoted generally therein by the reference numeral 78. To this end, the temperature measuring instrument 74 is preferably suitably supported, such that a considerable portion thereof projects outwardly therefrom, within a housing, denoted by the reference numeral 80 in FIG. 2, through the use of any conventional form of supporting means suitable for use for such a purpose. Although not shown in the interest of maintaining clarity of illustration in the drawing, it is to be understood that with the temperature measuring instrument 74 so supported within the housing 80 suitable leads (not shown) extend from the temperature measuring instrument 74 through the housing 80 and outwardly therefrom such that suitable signals representative of the temperature measurements being made by the temperature measuring instrument 74 pass through these leads (not shown), which are suitably connected in known fashion to a suitable conventional form of display/recording device (not shown) whereat the temperature measurements made by the temperature measuring instrument 74 are designed to be displayed and/or recorded.

Continuing with the description thereof, the mounting means 78, as best understood with reference to FIG. 2 of the drawing, includes the upstanding mounting flange, denoted therein by the reference numeral **80*a* with which the housing 80 is suitably provided at the end thereof through which the temperature measuring instrument 74 projects, and the complementary upstanding mounting flange, denoted therein by the reference numeral 56*d* with which the slag shield 56 is suitably provided at the end thereof, which is designed to be located externally of the gasifier vessel 14 when the slag shield 56 is secured in the manner described hereinbefore within the opening 66 in the sidewall 20 of the gasifier vessel 14. The upstanding mounting flange 80***a* with which the housing 80 is suitably provided and the complementary upstanding flange 56*d* with which the slag shield 56 is suitably provided are designed to be securely fastened together. In this regard, any conventional form of fastening means suitable for use for such a purpose may be employed for purposes of effectuating the fastening together of the upstanding mounting flange 80*a* and the complementary upstanding mounting flange 56*d* such as, for example, the plurality of threaded fasteners that have been depicted at 82 in FIG. 2.

With further regard thereto, the temperature measuring device 12 constructed in accordance with the best mode embodiment of the present invention preferably also includes purge gas means, denoted generally by the reference numeral 84 in FIG. 2 of the drawing. The purge gas means 84 is designed to be operative to supply a flow of purge gas in surrounding relation to the temperature measuring instrument 74 for the purpose of purging particulate matter therefrom so as to thereby ensure that the temperature measuring device 12 and more specifically, the temperature measuring instrument 74 thereof, remains unobscured. To this end, the purge gas means 84 includes a gas inlet pipe, denoted by the reference numeral 86 in FIG. 2. As best understood with reference to FIG. 2 of the drawing, the gas inlet pipe 86 is suitably mounted on the outer surface of the slag shield 56 such that the gas inlet pipe 86 is operatively connected in fluid flow relation to the through passage 76 with which the slag shield 56 is suitably provided. As such, the gas inlet pipe 86 is designed to function as an inlet to the through passage 76 of the slag shield 56. Thus, in accord with the best mode embodiment of the invention purge gas is designed to be injected through the gas inlet pipe 86 into the through passage 76 of the slag shield 56 and thereby also into surrounding relation to the temperature measuring instrument 74. Thereafter, the purge gas, which has been injected into the through passage 76 of the slag shield 56, exits from the slag shield 56 through the open end thereof into the interior of the gasifier vessel 14 whereupon the purge gas becomes assimilated with the other gases that are present within the gasifier vessel 14. The purge gas, which is utilized for this purpose, may be provided from any suitable source thereof, not shown in the drawing in the interest of maintaining clarity of illustration therein, to which the gas inlet pipe 86 is suitably connected for this purpose.

Thus, in accordance with the present invention there has been provided a new and improved device for obtaining measurements within a gasifier. Moreover, there has been provided in accord with the present invention such a new and improved measuring device which is operative to measure temperature within a gasifier. Also, in accordance with the present invention there has been provided such a new and improved temperature measuring device which is unaffected by the slagging that takes place within the gasifier. Further, there has been provided in accord with the present invention such a new and improved temperature measuring device which is characterized in the fact that the temperature measuring device is provided with shielding means operative for shielding the temperature measuring device from slag flow. In addition, in accordance with the present invention there has been provided such a new and improved temperature measuring device which is unaffected by the hostile environment within the gasifier in which the temperature measuring device is being utilized. Furthermore, there has been provided such a new and improved temperature measuring device which is characterized in the fact that the temperature measuring device is provided with purging means operative for purging particulate matter therefrom so as to thereby ensure that the temperature measuring device remains unobscured. Penultimately, in accordance with the present invention there has been provided such a new and improved temperature measuring device that is advantageously characterized in that it is suitable for employment in newly constructed gasifiers as well as being equally suitable for employment in retrofit applications. Finally, there has been provided in accord with the present invention such a new and improved temperature measuring device that is advantageously characterized in that it is relatively inexpensive to provide, yet despite being relatively simple in construction is capable of reliable operation.

While one embodiment of my invention has been shown, it will be appreciated that modifications thereof, some of which have been alluded to hereinabove, may be readily made thereto by those skilled in the art. I, therefore, intend by the appended claims to cover the modifications alluded to herein as well as all the other modifications which fall within the true spirit and scope of any invention.

What is claimed is:

1. A temperature measuring device for measuring the temperature within a gasifier vessel having an exterior, an interior and a through opening formed therein extending from the exterior to the interior thereof and wherein slag is produced and temperatures are on the order of 1700° F. to 3000° F. comprising:

a. a slag shield for affording protection against the slag produced within the gasifier vessel, said slag shield having a through passage formed therethrough, said slag shield further being of hollow construction at one end thereof so as to enable a cooling fluid to be passed therethrough;

b. slag shield mounting means mounting said slag shield within the through opening formed in the gasifier vessel such that said slag shield projects from the exterior of the gasifier vessel into the interior of the gasifier vessel, said slag shield mounting means including a first slag shield mounting flange mounted on the exterior of the gasifier vessel in encircling relation to the through opening formed in the gasifier vessel, a second slag shield mounting flange secured on said slag shield in encircling relation thereto, and first fastening means fastening together said first slag shield mounting flange and said second slag shield mounting flange;

c. slag shield cooling means operatively connected in fluid flow relation with said slag shield for the purpose of effecting the cooling of said slag shield, said slag shield cooling means including a cooling inlet pipe secured on said slag shield so as to provide an inlet into said slag shield for cooling fluid and a cooling outlet pipe secured in spaced relation to said cooling inlet pipe on said slag shield so as to provide an outlet from said slag shield for cooling fluid;

d. a temperature measuring instrument for measuring the temperature within the gasifier vessel;

e. temperature measuring instrument mounting means mounting said temperature measuring instrument in supported relation within the slag shield, said temperature measuring instrument mounting means including a housing, a first temperature instrument mounting flange, a second temperature instrument mounting flange and second fastening means, said temperature measuring instrument being mounted within said housing in supported relation thereto so that at least a portion of said temperature measuring instrument projects outwardly of said housing, said first temperature instrument mounting flange being secured on said housing in encircling relation thereto, said second temperature instrument mounting flange being secured on said slag shield in encircling relation thereto at one end thereof, and said second fastening means fastening together said first temperature instrument mounting flange and said second temperature instrument mounting flange; and f. purge gas means operatively connected in fluid flow relation to said slag shield, said purge gas means including a purge gas inlet pipe secured on said slag shield so as to provide an inlet passage into said slag shield for supplying purge gas in surrounding relation to said temperature measuring instrument for the purpose of purging particulate matter therefrom so as to ensure that said temperature measuring instrument remains unobscured.

2. The temperature measuring device as set forth in claim 1 wherein said temperature measuring instrument comprises a radiation thermometer.

3. The temperature measuring device as set forth in claim 1 wherein said temperature measuring instrument comprises an optical pyrometer.

* * * * *